US006627682B1

(12) United States Patent
Chaves et al.

(10) Patent No.: US 6,627,682 B1
(45) Date of Patent: *Sep. 30, 2003

(54) EPOXY COMPOSITIONS

(75) Inventors: Antonio Chaves, White Plains, NY (US); Eric R. Pohl, Mount Kisco, NY (US); Frederick D. Osterholtz, Pleasantville, NY (US)

(73) Assignee: Crompton Corporation, Middlebury, CT (US)

( * ) Notice: Subject to any disclaimer, the term of this patent is extended or adjusted under 35 U.S.C. 154(b) by 135 days.

This patent is subject to a terminal disclaimer.

(21) Appl. No.: 09/650,035

(22) Filed: Aug. 29, 2000

Related U.S. Application Data

(63) Continuation-in-part of application No. 09/543,020, filed on Apr. 4, 2000, now Pat. No. 6,221,938, which is a division of application No. 08/902,127, filed on Jul. 30, 1997, now Pat. No. 6,127,462, which is a continuation-in-part of application No. 08/735,055, filed on Nov. 7, 1996, now Pat. No. 5,714,532, which is a continuation of application No. 08/420,389, filed on Apr. 12, 1995, now abandoned.

(51) Int. Cl.⁷ ................................................ C08K 3/20
(52) U.S. Cl. ...................... 523/406; 523/407; 523/404
(58) Field of Search ................... 525/246, 288, 525/342; 523/406, 407, 409

(56) References Cited

U.S. PATENT DOCUMENTS

| | | | |
|---|---|---|---|
| 4,049,869 A | | 9/1977 | De Long |
| 4,291,136 A | * | 9/1981 | Keogh ........................ 525/102 |
| 4,716,194 A | | 12/1987 | Walker et al. |
| 4,778,624 A | | 10/1988 | Ohaski |
| 4,818,779 A | | 4/1989 | Witucki et al. |
| 4,877,654 A | | 10/1989 | Wilson |
| 4,889,747 A | | 12/1989 | Wilson |
| 5,017,632 A | | 5/1991 | Bredow et al. |
| 5,100,955 A | | 3/1992 | Pons et al. |
| 5,196,054 A | | 3/1993 | Schmuck et al. |
| 5,210,150 A | * | 5/1993 | Prejean .................... 525/329.7 |
| 5,218,018 A | * | 6/1993 | Tominaga et al. .......... 523/412 |
| 5,226,954 A | | 7/1993 | Suzuki |
| 5,376,704 A | * | 12/1994 | Barsotti ..................... 523/414 |
| 5,385,955 A | | 1/1995 | Tarshiani et al. |
| 5,714,532 A | * | 2/1998 | Osterholtz et al. .......... 524/114 |

FOREIGN PATENT DOCUMENTS

| | | |
|---|---|---|
| CA | 2093606 | 10/1993 |
| EP | 0 401 168 | 12/1990 |
| SU | 3730900 | 4/1980 |

* cited by examiner

Primary Examiner—Bernard Lipman
(74) Attorney, Agent, or Firm—Michael P. Dilworth

(57) ABSTRACT

The present invention is directed to fast reacting epoxy compositions employing select unidentate and chelated Ti(IV) and Sn(II) curing catalysts.

25 Claims, No Drawings

EPOXY COMPOSITIONS

RELATED APPLICATIONS

This application is a continuation-in-part of application Ser. No. 09/543,020 filed Apr. 4, 2000, now U.S. Pat. No. 6,221,934 (the contents of which are incorporated herein by reference) which is a divisional application of Ser. No. 08/902,127 filed Jul. 30, 1997, now U.S. Pat. No. 6,127,462, (the contents of which are incorporated herein by reference) which is a continuation-in-part of application Ser. No. 08/735,055, filed Nov. 7, 1996 (the contents of which are incorporated herein by reference), now U.S. Pat. No. 5,714,532 which is a continuation of application Ser. No. 08/420,389, filed Apr. 12, 1995, now abandoned (the contents of which are incorporated herein by reference).

BACKGROUND OF THE INVENTION

Conventional organic solvent based polymer compositions have become disfavored due to problems associated with environmental pollution, conservation of resources and providing a safe working environment. Instead, aqueous solution or dispersion type polymer compositions and high solids or 100 active polymer compositions have been proposed as alternatives. These alternative polymer compositions eliminate many of the problems associated with the evaporations of large amounts of organic solvents during the cure of low solids, organic solvent based polymer compositions. Much attention has been paid to reactive polymer emulsions and dispersions because of the ease with which they provide improved properties such as water and solvent resistance.

The use of combinations of polymers, aqueous emulsions and dispersions (lattices) and epoxy resins or compounds is well known in the art. For example, U.S. Pat. No. 4,049,869 to Long taught a composition including a high acid acrylic latex (5 to 20% by weight), a crosslinking agent (1 to 10%) and an ultraviolet absorber for use in preserving porous inorganic substrates. The crosslinking agent can include an epoxy resin.

Water-soluble silanes as additives in latex systems have also been disclosed in the prior art. For example, U.S. Pat. No. 5,017,632 to Bredow disclosed coating compositions for Portland cement or metal. The coating composition thereof can be mixed from a pair of storage stable components; a dry mix including a fine particle size filler, an epoxy resin and optionally, a course aggregate, and a wet mix including a polymer latex, an amine-functional epoxy curing agent, and a water-soluble epoxy or amino-silane.

U.S. Pat. No. 5,100,955 to Pons disclosed coating and adhesive compositions based on aqueous dispersions of addition polymers of one or more olefinically unsaturated monomers, emulsion stabilizers and/or emulsifiers and a water-soluble epoxysilane. The water-soluble epoxysilane is added preferably after the polymerization of the addition polymer. The shelf-life, however, of such compositions is only from two to three days.

EP Patent No. 401,496 to Hahn disclosed aqueous silicon-modified plastic dispersion as adhesives by epoxysilane-treatment of a dispersion of emulsion copolymers containing carboxylic acid, amide and sulfonic acid groups. Water soluble epoxysilanes of the formula $R_1R_2R_3R_4Si$ are disclosed with $R_1$=(cyclo)alkyl with reactive oxirane group; $R_2$=(cyclo)alkoxy, (cylco)alkyl, aryl or aralkyl; $R_3$, $R_4$= (cyclo)alkoxy, or OH. However, the composition of the synthetic latex is specific. Furthermore, the neat epoxysilane is added directly to the polymer.

In addition to these coating technologies, emulsions of trialkoxysilanes have been previously reported as waterproofing agents. For example, buffered aqueous silane emulsions are disclosed in U.S. Pat. Nos. 4,877,654 and 5,393,330. Alkylalkoxysilanes are also emulsified with nonionic and anionic emulsifiers for water repellency properties in U.S. Pat. No. 5,226,954.

High solids or 100 percent actives reactive epoxy compositions also eliminate or reduce the problems associated with the organic solvent based polymer compositions. Many of these epoxy compositions involve the reaction of epoxies with organic acids.

The broader use of these reactive epoxy compositions has been constrained because these epoxy compositions require high temperatures and/or long times to force the reaction of the epoxies with the organic acids. Heterogeneous and homogeneous catalysts have been used to promote the reactions between epoxides and organic acids. Sulfuric acid, p-toluene sulfonic acid, phosphomolybdic acid, boron triflouride, sodium alkoxide, alumina, ceric (IV) ammonium nitrate and photolytically generated superacids have been evaluated as catalysts for the reaction of cycloaliphatic epoxides with organic acids (S. Wu and M. D. Soucek, *Polymer*, 39 (23), 5747, 1998 and references cited herein). N. Iranpoor and B. Zeynizadeh found that bis-(trifluoroacetic) titanium oxide and trichlorotitanium triflate promoted the reaction of epoxy compounds (*Synthetic Communications*, 29 (6), 1017, 1999). However, many of these catalysts promote undesirable side reactions, such as the homopolymerization of the epoxy group, or are corrosive with many substrates.

M. Caron and K. B. Sharpless have shown that 2,3-epoxy compounds containing a titanate group were reactive with organic acids (*Journal of Organic Chemistry*, 50, 1557, 1985). The 2,3-epoxy compounds were made by reacting 3-propyloxiranemethanol with a stoichiometric amount of tetraisopropyl titanate. However, no epoxy ring opening reaction was found if a stoichiometric amount of methyl 3-propyloxirane methyl ether was mixed with tetraisopropyl titanate in the presence of amines. The methyl group on the ether blocked the formation of the 3-propyloxiranemethyl tri-isopropoxy titanate compound. These observations indicate that tetraisopropyl titanate is not a catalyst for the reaction of nucleophiles with epoxy compounds, unless the epoxy compound has a hydroxy group alpha to the oxirane group.

A need therefore exists for improved catalysts to facilitate the reaction of epoxies with organic acids.

SUMMARY OF THE INVENTION

The present invention is directed to reactive epoxy compositions employing select curing catalysts. The invention in this regard advantageously contemplates epoxy compounds that either contain silane groups (epoxysilane) or not (non-silane epoxy compound).

In a first practice of the present invention, the composition comprises a water insoluble or slightly soluble epoxysilane and/or a non-silane epoxy compound; an emulsifier; water; a compound containing at least one carboxylic acid group; and a curing catalyst selected from the group consisting of a chelated Ti(IV) compound and a chelated Sn(II) compound.

In a second practice of the invention, the composition comprises an epoxysilane and/or a non-silane epoxy compound; a compound containing at least one carboxylic acid group; and a curing catalyst selected from the group consisting of a unidentate Ti(IV) compound, a chelated Ti(IV) compound, a unidentate Sn(II) compound and a chelated Sn(II) compound, the composition being substantially free of water.

Another aspect of the present invention is to provide an article coated and cured with any of the aforementioned reactive compositions.

The compositions of the present invention offer improved properties such as solvent resistance, adhesion, smoothness, hardness and mar resistance.

DETAILED DESCRIPTIONS OF THE INVENTION

The composition of the present invention utilizes select curing catalysts to effectuate fast reactive formation of various esters and cross-linked polymers.

In a first practice of the invention, the composition is comprised of:

(I) an epoxy compound selected from the group consisting of a water insoluble or slightly soluble epoxysilane, a non-silane epoxy compound and mixtures thereof;

(II) a compound containing at least one carboxylic acid; and (III) a curing catalyst selected from the group consisting of a chelated Ti(IV) compound, a chelated Sn(II) compound and mixtures thereof;

(IV) water; and optionally, (V) an emulsifier.

In a second practice of the invention, the composition is comprised of:

(I) an epoxy compound selected from the group consisting of an epoxy silane, a non-silane epoxy compound and mixtures thereof;

(II) a compound containing at least one carboxylic acid group; and (III) a curing catalyst selected from the group consisting of aunidentate Ti(IV) compound, a chelated Ti(IV) compound, a unidentate Sn(II) compound, a chelated Sn(II) compound and mixtures thereof, said composition being substantially free of water.

Additional components, such as pH buffers may be added.

The catalyst permits curing of the composition at lower temperatures, on the order of 150° F. or even a lower temperature, such as room temperature, than is the case with compositions not containing the catalyst.

The cured product exhibits very satisfactory to superior properties such as high resistance to chemicals and high resistance to stains.

Epoxysilanes

Epoxysilanes useful in regard to the first practice of the invention are of the general structure $R^1{}_aR^2{}_bSi(OR^3)_{4-a-b}$ where for the purposes of this formula, $R^1$ is an epoxy substituted alkyl or aralkyl group, where the alkyl or aralkyl group may have from four to thirty carbon atoms, $R^3$ is an alkyl oralkoxy-substituted alkyl, aryl or aralkyl group having from two to sixteen carbon atoms, $R^2$ is an alkyl group or alkoxy substituted alkyl, aryl or aralkyl group having from one to twenty carbon atoms, a is one to three, and b is zero to two, with the proviso that a+b is 1,2, or 3. Each R group may be cyclic, branched or linear.

The term water insoluble or slightly soluble epoxysilane includes silanes with solubilities less than 8.0 weight percent in water. Water soluble silanes are specifically excluded from these silanes because compositions made with these silanes are not stable for extended periods of time, i.e. more than two or three days at ambient conditions.

The preferred epoxy functional silanes include:

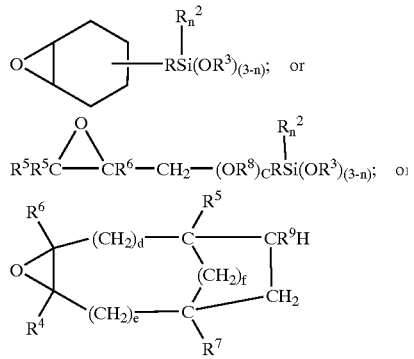

where for purposes of the three preferred formulae shown above: R is $(CH_2)_m$, where m has a value of zero to six;

$R^2$ is a $C_1$–$C_{10}$ alkyl, optionally substituted with a $C_1$–$C_{10}$ alkoxy, or a $C_6$–$C_{10}$ aryl or a $C_7$–$C_{10}$ aralkyl group;

$R^3$ is a $C_2$–$C_6$ alkyl, optionally substituted with a $C_1$–$C_{10}$ alkoxy, or a $C_6$–$C_{10}$ aryl or a $C_7$–$C_{10}$ aralkyl group;

$R^4,R^5,R^6$ or $R^7$ are each hydrogen or a $C_1$–$C_6$ alkyl group;

$R^8$ is a $C_1$–$C_4$ alkylene group or a $C_7$–$C_{10}$ aralkylene or a $C_6$–$C_{10}$ arylene group;

$R^9$ is 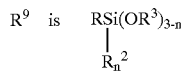

n has a value of zero, one or two;

c, d and e each have a value of zero or one; and f has a value of zero, one or two.

Mixtures of epoxy silanes having the formulae described above may also be used.

More specifically, $R^2$ denotes a substituted or unsubstituted monovalent hydrocarbon group exemplified by alkyl groups (e.g., methyl, ethyl, isobutyl, and octyl groups), alkenyl groups (e.g., vinyl and allyl groups), aryl groups (e.g., phenyl, tolyl and naphthyl groups), and aralkyl groups (e.g., benzyl and 2-phenylethyl groups), as well as those substituted groups obtained by the replacement of one or more of the carbon atoms in the above named hydrocarbon groups with various kinds of atoms and/or groups including sulfur and oxygen, and/or replacement of one or more of the hydrogen atoms in the above named hydrocarbon groups with various kinds of groups, including, but not limited to, halogen atoms, epoxy, methacryloxy, acryloxy, carboxyl, ester, cyano, and polyoxyalkylene groups.

$R^3$ are alkyl, alkoxyalkyl, aryl or aralkyl radicals such as ethyl, n-propyl, n-butyl, n-hexyl, n-heptyl, n-octyl, n-nonyl, n-decyl, and cycloalkyl radicals such as cyclopentyl, cyclohexyl, cycloheptyl, and cyclobctyl. Illustrative of suitable branched chain hydrocarbon radicals for $R^3$ are alkyl radicals such as isopropyl, isobutyl, sec-butyl, isobutyl, sec-amyl, and 4-methyl-2-pentyl. Alkoxyalkyl groups may be exemplified by n-butoxy ethyl and methoxy propyl. Aryl groups may be exemplified by phenyl and aralkyl groups may be exemplified by benzyl or ethyl phenyl.

$R^4,R^5,R^6$ or $R^7$ are hydrogen atoms or monovalent hydrocarbon groups having 1 to 6 carbon atoms exemplified by alkyl groups (e.g., methyl, ethyl, propyl, isopropyl, n-butyl and isobutyl groups), alkenyl groups (e.g., vinyl and allyl groups), and aryl groups (e.g., phenyl group). These hydrocarbon groups may be substituted by halogen atoms and functional groups, including cyano and epoxy, for a part or all of the hydrogen atoms therein.

Examples of epoxysilanes used in accordance with the present invention include, but are not limited to, those silanes described by Brison and Lefort in French Patent No. 1,526,231. Specific examples are 2-(3,4-epoxycyclohexyl)ethyltriethoxysilane, 4-(methyldiethoxysilyl)-1,2-epoxycyclohexane, 3-(3,4-epoxycyclohexyl)propyltri-(isobutoxy)silane, 3-(2,3-epoxybutoxy)propyltriethoxysilane, and [2.2.1]bicycloheptane 2,3-epoxy-5-(2-triethoxysilyl)ether and mixtures thereof.

Epoxysilanes useful in regard to the second practice of the invention are those defined above, except that the definition of $R^3$ is an alkyl or alkoxy-substituted alkyl group, having from one to ten carbon atoms, or an aryl group having from six to ten carbon atoms or an aralkyl group having from seven to ten carbon atoms. Because the composition of the second practice is substantially free of water, water soluble epoxysilanes and epoxysilanes where $R^3$ is methyl can be used in addition to water insoluble and slightly soluble epoxysilanes.

The silane(s) is present at about 0.1 to 70 percent by weight of the composition [(I)–(III)]. The preferred concentration is about 1.0 to 10 percent of the weight of the total composition [(I)–(III)].

Non-Silane Epoxy Compounds

Without limitation, non-silane epoxy compounds useful in regard to the first and second practice of the present invention have the formula

where

A is 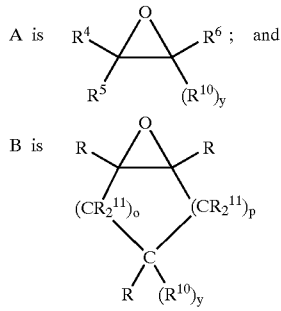

where for purposes of this formula:

$R^4$, $R^5$ and $R^6$ are each independently hydrogen or a $C_1$–$C_6$ alkyl group;

each $R^{10}$ is independently a $C_1$–$C_{20}$ alkylene;

each $R^{11}$ is independently hydrogen, a $C_1$–$C_{20}$ alkyl group (which alkyl group may have one or more carbon atoms replaced with oxygen or sulfur atoms), a $C_6$–$C_{20}$ aryl group or a $C_7$–$C_{20}$ aralkyl group. It is also envisioned that two $R^{11}$ groups on different carbon atoms can be linked to each other to form an alkylene bridge. This alkylene bridge forms bicyclic ring structures.

Q is a polymer, a $C_1$–$C_{20}$ alkylene, a $C_1$–$C_{20}$ arylene, a $C_1$–$C_2$. aralkylene or a $C_1$–$C_{20}$ alkenylene group as well as those substituted groups obtained by the replacement of one or more of the carbon atoms in the above named alkylene, arylene, aralkylene or alkenylene groups with various kinds of atoms or groups including sulfur, nitrogen and oxygen atoms and/or replacement of the hydrogen atoms with various kinds of groups including but not limited to halogen, methacryloxy, acryloxy, carboxyl, oxo, ester, cyano and polyoxyalkylene. The polymer has a molecular weight between about 250 to 108 grams per mole. Examples of the polymer which can be used in the present invention include: polyethylene, polypropylene, polyethylene polypropylene copolymers, urethanes, epoxies, polystyrene and urethane acrylic polymers. Also useful herein are acrylic homopolymers, vinyl acrylic polymers, methacrylic polymers, styrene acrylic copolymers, silicone polymers, polyesters and mixtures thereof.

g and h each have a value of 0 to 20, and g+h>0;

o and p are each 0 to 4; and y is 0 or 1.

Preferred non-silane epoxy compounds include 1,2-butadiene diepoxide, 1,4-butanediol diglycidyl ether, diepoxycyclooctane, 2,2-dimethyl-1,3-propanediol diglycidyl ether, ethylene glycol diglycidyl ether, and diglycidyl ether of bisphenol-A, alpha, omega-diglycidyl polyethylene oxide, and alpha, omega-diglycidoxypropyl polydimethylsiloxane, and mixtures thereof.

The non-silane epoxy compound is present at about 0.1 to 70 percent by weight of the total composition [(I)–(III)]. The preferred concentration is about 1.0 to 10 percent of the weight of the total composition.

Compounds Containing at Least One Carboxylic Acid Group

As compound (II) for both the first and second practices, the present invention contemplates compounds having at least one carboxylic acid group. These include carboxylic acid compounds per se, and polymers that have been modified to contain at least one carboxylic acid group.

With respect to carboxylic acid compounds per se, polycarboxylic acid compounds are preferred. The acids of compound (II) in this regard may be aliphatic, unsaturated and/or aromatic. Without limitation, these compounds preferably have 1 to 20 carbon atoms, exclusive of those associated with the carboxylic acid function. Representative of such compounds are: oxalic acid, malonic acid, succinic acid, glutaric acid, adipic acid, maleic acid, fumaric acid, phthalic acid and mixtures thereof.

Exemplary of the polymers contemplated for compound (II) are those which contain terminal or pendant carboxy groups (—COOH), some of which may be in its neutralized salt form-(e.g., —COOK). These reactive polymers have molecular weights between 500 and 108 grams per mole. The preferred reactive polymer contains a carboxylic acid group in an amount sufficient to have an acid number, as determined by ASTM D669, between 1 and 780, and preferably, between, 10 and 280.

Examples of reactive polymers which can be used in the present invention include carboxylic acid modified polymers chosen from the following: polyethylene, polypropylene, polyethylene propylene copolymer, urethanes, epoxies, polystyrenes and urethane acrylic polymers. Also useful herein are acrylic homopolymers, vinyl acrylic polymers, methacrylic polymers. Also useful herein are acrylic homopolymers, vinyl acrylic polymers, methacrylic polymers, styrene acrylic copolymers, polyesters and mixtures thereof. These reactive polymers may also contain other organic functional groups, including hydroxyl, amide, vinyl and halogens are contemplated as being within the scope of reactive polymers.

Specific examples of preferred reactive polymers that can be used in accordance with the first and second practices of the invention are Joncryl 611, HPB 671, from S. C. Johnson Polymer of Racine, Wis. Specific examples of the preferred reactive polymers that can be used in accordance with only the first practice of this invention include commercially available styrene acrylic emulsion polymers, such as JONCRYL®s 554, 540, 77, and 95, and SCX2500, all commercially available from SC Johnson Polymer of Racine, Wis. Other specific examples of commercially available preferred reactive polymers materials which can be used include NEOCRYL® acrylic emulsions, NEOREZ® water-borne urethane polymers and NEOPAC® water-borne urethane acrylic copolymers, available from ZENECA Resins of Wilmington, Mass., and UCAR® acrylic and vinyl acrylic latexes available from Union Carbide Corporation of Danbury, Conn.

Polymer emulsions and polymer dispersions, which contain no emulsifiers, may also be used in the first practice of the invention herein.

The polymer should be present at about 30 to 99.89 weight percent of the total composition.

Catalyst

The composition of the present invention should contain a catalyst component, composed of one or more than one catalyst capable of enabling the composition to cure faster at ambient or elevated temperatures compared to the same composition without the catalyst.

In the first practice of the present invention, the curing catalyst is a chelated Ti(IV) compound and/or a chelated Sn(II) compound. Chelated as used herein refers to the fact that the ligands of the Ti(IV) or Sn(II). can bond to the metal through more than one donor atom. In the second practice of the present invention, the curing catalyst is a unidentate Ti(IV) compound, a chelated Ti(IV) compound, a unidentate Sn(II) compound and/or a chelated Sn(II) compound. Unidentate as used herein refers to the fact that the ligand of the Ti(IV) or Sn(II) can bond to the metal through only one donor atom.

Without limitation, serviceable unidentate Ti(IV) compounds in this regard include titanium tetrahalides. Preferred compounds in this regard include those selected from the group consisting of titanium tetrachloride, titanium tetrabromide, titanium tetraiodide and mixtures thereof. Separately, unidentate Ti(IV) compounds include compounds having the formula $Ti(R^{12})_4$ where for purposes of this formula, each $R^{12}$ is independently a $C_1-C_{20}$ alkoxy, a $C_6-C_{20}$ aryloxy, a $C_7-C_{20}$ aralkyloxy or a $C_1-C_{20}$ acyloxy group. Preferred unidentate Ti(IV) compounds include tetra isopropyl titanate tetramethyl titanate, tetraethyl titanate, tetrabutyl titanate, tetra(2-ethylhexyl) titanate, tetraisostearoyl titanate and mixtures thereof.

Suitable unidentate Sn(II) compounds are, without restriction, those having the formula $Sn(R^{13})_2$ where $R^{13}$ is independently a $C_1-C_{20}$ alkoxy, a $C_6-C_{20}$ aryloxy, a $C_1-C_{20}$ acyloxy group, a sulfonate or a $C_1-C_{20}$ alkyl or $C_6-C_{20}$ arylsulfonate. Preferred unidentate Sn(II) compounds in this regard include tin(II)acetate, tin(II)2-ethylhexanoate, tin(II) methanesulfonate, tin(II)sulfonate, tin(II)octbate and the like, and mixtures thereof.

Chelated Ti(IV) compounds include compounds having the formula $Ti(R^{14})_{4-(q)(r)}(L_qR^{15})_r$ where for purposes of this formula, each $R^{14}$ is independently a hydroxy, a $C_1-C_{20}$ alkoxy, a $C_6-C_{20}$ aryloxy, a $C_7-C_{20}$ aralkyloxy or a $C_1-C20$ acyloxy group; $R^{15}$ is independently a $C_2-C_{20}$ alkylene, a $C_2-C_{20}$ alkenylene, a $C_6-C_{20}$ arylene or a $C_7-C_{20}$ aralkylene, wherein one or more of the carbon atoms can be replaced with oxygen, nitrogen or sulfur atoms and wherein one or more of the hydrogens can be replaced with halogen, oxo or thio groups; L is an oxygen or sulfur atom or NH group; q is an integer from 2 to 4 inclusive, and r is 1 or 2 with the proviso that the product of (q)(r) is equal to or less than 4. Examples of chelated titanates are dihydroxy-bis-[2-hydroxypropanato(2-)—$O^1$, $O^2$) (2-)titanate, bis-(ethyl-3-oxobutanolato-$O^1$, $O^3$]-bis-(2-propanolato) titanium, isopropoxy(triethanolaminato)titanium, titanium lactate and the like, including mixtures thereof.

Chelated Sn(II) compounds include compounds having the formula $Sn(L^1{}_sR^{16})$ where $L^1$ and $R^{16}$ are as defined for L and $R^{15}$ respectively above, and s is equal to 2. Examples of chelated Sn(II) compounds are tin(II)oxalate, tin(II) succinate, tin(II)maleate and $Sn(SCH_2C(=O)O)$ and the likes, including mixtures thereof.

In the case where water is present, the chelated Ti(IV) and chelated Sn(II) compounds are preferred.

The catalyst can be used in an amount of 0.01 to 20 percent, preferably about 0.1 to 10 parts, based on the total composition [(I)–(III)].

In an embodiment of the first and second practice of the invention, the composition thereof may further comprise an organic solvent. Typical solvents in this regard include methyl ethyl ketone, methyl butyl ketone, ethyl acetate, toluene, xylene, n-butoxyethanol, and the like, and mixtures thereof.

The composition contemplated by the second practice of the present invention is substantially free of water. That is, any water present is present only in de minimus amounts; preferably, no water is present.

Optional Ingredients

In both the first and second practices, the composition of the present invention may additionally contain cross-linking agents, such as urea and melamine resins which are methylolated and/or alkoxylated, epoxy resins (other than as hereinbefore defined), aziridines and carbodiimides. Such agents may be present at 0.1 to 20 weight percent of the total composition, as long as they do not destabilize the composition during storage.

In the first practice of the invention, the pH of the total composition may impact upon its hydrostability. High alkalinity or high acidity of the composition catalyzes the hydrolysis of the epoxy group. The closer the pH of the composition is to neutral (pH=7), the better the stability of the epoxysilane and the emulsion of the epoxysilane. Therefore, the preferred range of pH of the total composition is 5.5 to 8.5. Substances which can be used to adjust the pH are organic or inorganic buffers including sodium acetate, sodium citrate, sodium carbonate, sodium bicarbonate, sodium hydrogen phosphate, sodium dihydrogen phosphate, and the corresponding potassium salts.

Other optional ingredients for inclusion herein are fillers, thixotropes, pigments, plasticizers, coalescing agents, biocides and fungicides as are commonly known and used in the art.

In particular regard to the first practice of the invention, the following ingredients may further be optionally present:

Emulsifiers

In the first practice of the present invention, emulsifiers may be present. When such a component is desired, they include nonionic, anionic and cationic surfactants or mixtures of nonionic with anionic or cationic surfactants. Examples of the nonionic surfactants include polyoxyethylene alkyl ethers, polyoxyethylene alkyl phenyl ethers, polyoxyethylene fatty acid esters, sorbitan fatty acid esters, and polyoxyethylene sorbitan fatty acid esters. Examples of the anionic surfactants include fatty acid salts, alkyl sulfate ester salts, alkyl benzene sulfonate, alkyl phosphate, alkylallyl sulfate ester salt, and polyoxyethylenealkylphosphate ester. Example of the cationic surfactants include quaternary ammonium salts such as long chain alkyl trimethylammonium salts, long chain alkyl benzyl dimethyl ammonium salts, and di (long chain alkyl dimethyl ammonium salts. A further listing of surfactants useful in the present invention may be those described in 1999 McCutcheon's Vol. 1: *Emulsifiers and Detergents*, North American Edition (The Manufacturing Confectioner Publishing Co;, Glen Rock) 1999, which is incorporated herein by reference.

The emulsifier(s) when used should be present in the range of 0.05 to 30 weight percent based on weight of the composition of (I)–(III), and preferably 0.2 to 20 weight percent of the composition of [(I)–(III)].

The appropriate HLB (hydrophilic-lipophilic balance) of the surfactants is chosen to correspond to the HLB of the specific epoxy silane or non-silane epoxy compound being emulsified. The method for selecting the optimum HLB for a substance is well known to one skilled in the art and described in "The HLB System" by ICI Americas Inc.

Again, the emulsifiers are chosen so that the appropriate HLB is chosen to correspond to the HLB of the specific reactive polymer being emulsified with the proviso that the emulsifier(s) chosen to emulsify the reactive polymer are compatible with the emulsifier(s) used to make a precursor epoxy silane emulsion or non-silane epoxy emulsion. In the precursor reactive polymer emulsion, the emulsifier should be present at 1 to 50 weight percent of the reactive polymer.

Water

In the first practice of the present invention, water may be present in an amount ranging from 29.85 to 99.75 weight percent of the total composition (I)–(III).

Method of Preparation and Use

The precursor emulsions of the epoxysilane and/or non-silane epoxy compounds of the first practice of the invention are prepared by first mixing the epoxysilane and/or non-silane epoxy compound (I) with an emulsifier (V). Water is added and the mixture is stirred to provide a white, milky emulsion. The pH of the resulting emulsion is adjusted, if necessary, to pH 7.0±1.5.

The epoxysilane and/or non-silane epoxy compound or precursor emulsion of the epoxysilane and/or non-silane epoxy compound is added to the compound containing at least one carboxylic acid (II) or to a compound containing at least one carboxylic acid emulsion [Components (II), (IV) and (V)] to provide a stable composition. The method employed to mix these components is not critical and any commonly used low shear equipment, such as a blade or paddle mixer, is suitable. The catalyst (III) and any optional ingredients may be added at any time, although in some cases catalysts should be added last.

The solutions and emulsions may be used as two component systems i.e., components (I), (IV) and (V), and components (II), (III) and optional components, mixed in shortly before use, have but sufficient stability when mixed to be used as one-component systems. The composition of components (I)–(V) form uniform aqueous solutions, dispersions or emulsions. Many uses of these compositions require drying under ambient conditions or at moderately elevated temperatures (e.g., baking). The resulting dried material has excellent solvent resistance, chemical resistance, hardness, mar resistance, adhesion, water resistance, durability or weatherability.

The compositions of the second practice of the present invention can be prepared by mixing the epoxysilane and/or non-silane epoxy compound (I), with the compound containing at least one carboxylic acid (II) the catalyst (III) and optional ingredients. The method employed to mix these components is not critical and any commonly used low shear equipment, such as a blade or paddle mixer, is suitable.

Once the catalyst is added to the composition of the second practice, the reaction between the epoxysilane and/or non-silane epoxy and the compound containing at least one carboxylic acid will begin. It is therefore envisioned that the second practice of the present invention will be as a two-component system. In preparing the two-component system, it is preferred that first component contains the epoxysilane and/or non-silane epoxy compound (I) and optional ingredients. The second component contains the compound containing at least one carboxylic acid (II), the catalyst (III) and optional ingredients. Components one and two are stable and will react only after component one and component two are mixed. Although component one could consist of epoxysilane and/or non-silane. epoxy compound (I) and catalysts(s) (III) or compound containing at least one carboxylic acid group (II), these mixtures are not preferred. The mixture of the catalyst(s) (III) with the epoxysilane and/or non-silane epoxy compound (I) can promote the homopolymerization of the epoxysilane and/or non-silane epoxy compound, resulting in poor. shelf-life stability. The mixture of the epoxysilane and/or non-silane epoxy compound (I) with the compound containing at least one carboxylic acid causes the slow reaction between (I) and (II) and poor shelf-life stability.

Many uses of the composition of components (I), (II) and (III) and optional ingredients require curing at ambient conditions or at moderately elevated temperatures (e.g., baking). The resulting cured material has excellent solvent resistance, chemical resistance, hardness and mar resistance. When component (I) contains the epoxysilane, excellent adhesion,.water resistance and weatherability are achieved.

The compositions made according to the present invention may be used as industrial and architectural coatings, sealants, wood coating, adhesives and in mastics, i.e., generally in any application where the polymer would be used. For example, in textile print paste applications, the composition of the present invention would provide crock resistant colorfast applications. In wood coating, the present compositions would provide stain resistance, mar resistance and block resistance between latex surfaces in storage. As to architectural coatings, the present composition would provide scrub resistance and other improved properties. In sealants, the present composition would provide adhesion to inorganic surfaces. As is clear to one of ordinary skill in the art, there is vast array of applications of the present invention in coating, sealant, adhesives, masonry sealers, fiberglass binders and sizes, inks and other waterborne polymer systems.

EXAMPLES OF THE SECOND PRACTICE OF THE PRESENT INVENTION

These examples demonstrate the second practice of the present invention using a non-silane epoxy compound.

Procedure

In Examples 1A–1D, the non-silane epoxy compound I was represented by 4-vinyl cyclohexene oxide; the component (II) compound having at least one carboxylic acid group-was represented by 2-ethylbutyric acid.

The curing catalyst compound (III), were as follows:

| | |
|---|---|
| Example 1A | tin(II)octoate |
| Example 1B | tetra-isopropyl titanate |
| Example 1C | titanium lactate chelate |
| Example 1D | tin(II) 2-ethylhexanoate |

In each of these examples, the half-lives of the reactions were compared with the non-catalyzed reaction (control).

Into a 100 mL round-bottomed flask with a magnetic stirrer, thermometer, condenser, nitrogen bubbler and rubber septum was added the 37 grams 1-methoxyethyl ether (Aldrich Chemical Co.), 4.6 grams (0.396 mol) 2-ethylbutyric acid (Aldrich Chemical Co.), and individual curing catalysts. The flask was placed in the preheated oil bath at 90° C. Once the temperature of the mixture stabilized at 90° C., 4.9 grams (0.396 mol) 4-vinyl cyclohexene oxide (Union Carbide Corp.) was added via syringe. Aliquots of the reaction mixture were taken from the flask via syringe and titrated.

Results were as follows:

| Example | Catalyst | Half-Life (hrs) |
|---|---|---|
| 1A | tin(II)octoate | 10 |
| 1B | tetraisopropyl titanate | 4 |
| 1C | titanium lactate chelate | 66 |
| 1D | tin(II)2-ethylhexanoate | 4 |
| Control | None | 400 |

In Example 2A, compound (I) was represented by 4-(2-triethoxysilyethyl)cyclohexene oxide; compound (II) was 2-ethylbutyric and; Catalyst (III) was tetra-isopropyl titanate. Procedures were as otherwise described in Examples 1A–1D. The result was as follows:

| Example | Catalyst | Half-life (hrs) |
|---|---|---|
| 2A | tetraisopropyl titanate | 1 |

In Examples 3A and 3B, compound (I) was represented by 4-vinyl cyclohexene oxide; compound (II) was the reactive polymer JONCRYL 611. In Example 3A, the catalyst (III) was tetra-isopropyl titanate. Example 3B was the control, where no catalyst was used. Procedures were as otherwise described in Examples 1A–1D. Results were as follows:

| Example | Catalyst | Half-life (hrs) |
|---|---|---|
| 3A | tetraisopropyl titanate | 8 |
| Control (3B) | none | No reaction |

As evidenced by the foregoing, the compositions of the invention evince dramatically increased reactivity as compared to a system without catalyst.

What is claimed is:

1. A composition comprising:
   a water insoluble or slightly soluble epoxysilane;
   (II) a compound containing at least one carboxylate acid group;
   (III) a curing catalyst selected from the group consisting of a chelated Ti(IV) compound, a chelated Sn(II) compound, and mixtures thereof;
   (IV) water; and optionally,
   (V) an emulsifier.

2. The composition of claim 1 wherein said water insoluble or slightly soluble epoxysilane is selected from the group consisting of

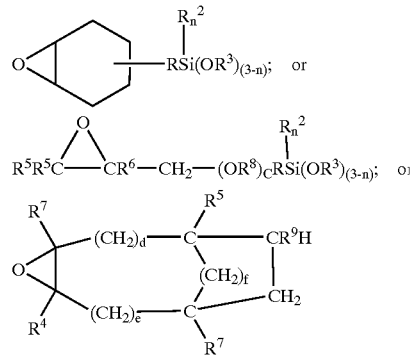

where:
   R is $(CH_2)_m$, where m has a value of 0 to 6;
   $R^2$ is a $C_1$–$C_{10}$ alkyl, optionally substituted with a $C_1$–$C_{10}$ alkoxy, or a $C_6$–$C_{10}$ aryl or a $C_7$–$C_{10}$ aralkyl group;
   $R^3$ is a $C_2$–$C_6$ alkyl, optionally substituted with a $C_1$–$C_{10}$ alkoxy, or a $C_6$–$C_{10}$ aryl or a $C_7$–$C_{10}$ aralkyl group;
   $R^4, R^5, R^6$ or R7 are each hydrogen or a $C_1$–$C_6$ alkyl group;
   $R^8$ is a $C_1$–$C_4$ alkylene group or a $C_7$–$C_{10}$ aralkylene or a $C_6$–$C_{10}$ arylene group;
   $R^9$ is $RSi(OR^3)_{3-n}$
   $R^2n$
   n is 0, 1 or 2;
   c, d and e are each independently 0 or 1; and
   f is 0, 1 or 2.

3. The composition of claim 2 wherein said water insoluble or slightly soluble epoxysilane is selected from the group consisting of (3,4-epoxycyclohexyl)-ethyltriethoxysilane, 4-(methyldiethoxysilyl)-1,2-epoxycyclohexane, 3-(3,4-epoxycyclohexylpropyl) tri (isobutoxy)silane, 3-(2,3-epoxybutoxy) propyltriethoxysilane, bicycloheptane-2,3-epoxy-5-(2-triethoxysilyl)ether and mixtures thereof.

4. The composition of claim 1 wherein said compound (II) is selected from the group consisting of oxalic acid, malonic acid, succinic acid, glutaric acid, adipic acid, maleic acid, fumaric acid, phthalic acid and mixtures thereof.

5. The composition of claim 1 wherein said compound (II) is a carboxylic acid modified polymer, said polymer being selected from the group consisting of polyethylene, polypropylene, polyethylene propylene copolymer, urethanes, epoxies, polystyrenes, urethane acrylic copolymers, acrylic homopolymers, vinyl acrylic polymers, methacrylic polymers, styrene acrylic copolymers, polyesters and mixtures thereof.

6. The composition of claim 1 wherein said chelated Ti(IV) compound has the formula

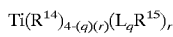
$Ti(R^{14})_{4-(q)(r)}(L_qR^{15})_r$ wherein
  each $R^{14}$ is independently a hydroxy, a $C_2$–$C_{20}$ alkoxy, a $C_6$–$C_{20}$ aryloxy, a $C_7$–$C_{20}$ aralkyloxy, or a $C_1$–$C_{20}$ acyloxy group;
  each $R^{15}$ is independently a $C_2$–$C_{20}$ alkylene, a $C_2$–$C_{20}$ alkenylene, a $C_6$–$C_{20}$ arylene or a $C_7$–$C_{20}$ aralkylene, where any one of said alkylene, alkenylene, arylene or aralkylene groups may have one or more carbon atoms replaced with oxygen, nitrogen or sulfur atoms and where any one of which groups may be substituted with one or more halogen, oxo or thio groups;
  L is oxygen, sulfur or NH;
  q is an integer from 2 to 4 inclusive.

7. The composition of claim 6 wherein said chelated Ti(IV) compound is selected from the group consisting of dihydroxy-bis-[2-hydroxypropanato-(2-)-$O^1$,$O^2$](2-)titanate, bis-(ethyl-3-oxobutanolato-$O^1$,$O^3$]-bis-(2-propanolato)titanium, isopropoxy(triethanolaminato)titanium, titanium lactate and mixtures thereof.

8. The composition of claim 1 wherein said chelated Sn(II) compound has the formula $Sn(L_s^1R^{16})$
where
  each $R^{16}$ is independently a $C_1$–$C_{20}$ alkylene, a $C_2$–$C_{20}$ alkenylene, a $C_6$–$C_{20}$ arylene or $C_7$–$C_{20}$ aralkylene, where any one of said alkylene, alkenylene, arylene or aralkylene groups may have one or more carbon atoms replaced with oxygen nitrogen or sulfur atoms and where any one of which groups may be substituted with one or more halogen, oxo or thio groups;
  $L^1$ is oxygen, sulfur or NH; and
  s is 2.

9. The, composition of claim 1 wherein said chelated Sn(II) compound is selected from the group consisting of tin(II)oxalate, tin(II)succinate, tin (II)maleate, $Sn(SCH_2C(=O)O)$ and mixtures thereof.

10. A composition comprising:
  (I) an epoxy silane,
  (II) a compound containing at least one carboxylic acid group; and
  (III) a curing catalyst selected from the group consisting of a unidentate Ti (IV) compound, a chelated Ti(IV) compound, a unidentate Sn(II) compound, a chelated Sn(II) compound thereof and mixtures thereof, said composition being substantially free of water.

11. The composition of claim 10 wherein said epoxy silane compound is selected from the group consisting of

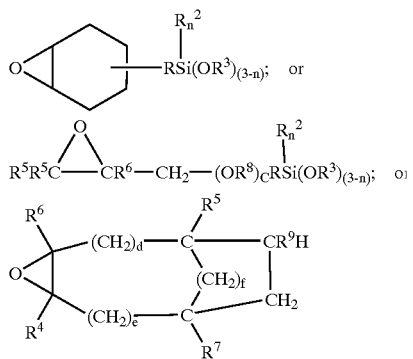

where:
  R is $(CH_2)_m$, where m has a value of 0 to 6;
  $R^2$ is a $C_1$–$C_{10}$ alkyl, optionally substituted with a $C_1$–$C_{10}$ alkoxy, or a $C_6$–$C_{10}$ aryl or a $C_7$–$C_{10}$ aralkyl group;
  $R^3$ is a $C_2$–$C_{10}$ alkyl, optionally substituted with a $C_1$–$C_{10}$ alkoxy, or a $C_6$–$C_{10}$ aryl or a $C_7$–$C_{10}$ aralkyl group;
  $R^4$,$R^5$,$R^6$ or $R^7$ are each hydrogen or a $C_1$–$C_6$ alkyl group;
  $R^8$ is a $C_1$–$C_4$ alkylene group or a $C_7$–$C_{10}$ aralkylene or a $C_6$–$C_{10}$ arylene group;
  $R^9$ is $RSi(OR^3)_{3-n}$
  $R^2_n$
  n has a value of 0, 1 or 2;
  c, d and e are each independently 0 or 1; and
  f has a value of 0, 1 or 2.

12. The composition of claim 11 wherein said epoxy silane compound is selected from the group consisting of (3,4-epoxycyclohexyl)ethyltriethoxysilane, 4-methyldiethoxysilyl)-1,2-epoxycyclohexane, 3-(3,4-epoxycyclohexylpropyl tri-(isobutoxy)silane, 3-(2,3epoxybutoxy)propyltriethoxysilane, bicycloheptane-2,3-epoxy-5-(2-triethoxysilyl)ether and mixtures thereof.

13. The composition of claim 10 wherein said compound (II) is selected the group consisting of oxalic acid, malonic acid, succinic acid, glutaric acid, adipic acid, maleic acid fumaric acid, phthalic acid and mixtures thereof.

14. The composition of claim 10 wherein said compound (II) is selected from the group consisting of polyethylene, polypropylene, polyethylene propylene copolymer, urethanes, epoxies, polystyrenes, urethane acrylic copolymers, acrylic homopolymers, vinyl acrylic polymers, methacrylic polymers, styrene acrylic copolymers, polyesters and mixtures thereof.

15. The composition of claim 10 wherein said chelated Ti(IV) compound has the formula

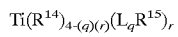
$Ti(R^{14})_{4-(q)(r)}(L_qR^{15})_r$ wherein
  each $R^{14}$ is independently a hydroxy, a $C_1$–$C_{20}$ alkoxy, a $C_6$–$C_{20}$ aryloxy, a $C_7$–$C_{20}$ aralkyloxy, or a $C_1$–$C_{20}$ acyloxy group;
  each $R^{15}$ is independently a $C_2$–$C_{20}$ alkylene, a $C_2$–$C_{20}$ alkenylene, a $C_6$–$C_{20}$ arylene or a $C_7$–$C_{20}$ aralkylene, where any one of said alkylene, alkenylene, arylene or aralkylene groups may have one or more carbon atoms replaced with oxygen, nitrogen or sulfur atoms and where any one of said groups may be substituted with one or more halogen, oxo or thio groups;
  L is oxygen, sulfur or NH; and
  q is an integer from 2 to 4 inclusive.

16. The composition of claim 15 wherein said chelated Ti(IV) compound is selected from the group consisting of dihydroxy-bis-[2-hydroxypropanato-(2)-$O^1,O^2$](2-)titanate, bis-(ethyl-3-oxobutanolato-$O^1,O^3$]-bis-(2-propanolato) titanium, isopropoxy(triethanolaminato)titanium, titanium lactate and mixtures thereof.

17. The composition of claim 10 wherein said unidentate Ti(IV) compound is a titanium tetrahalide or has the formula Ti(OR$^{12}$)$_4$ where each R$^{12}$ is independently a $C_1$–$C_{20}$ alkoxy group, unsubstituted or substituted with one or more $C_1$–$C_6$ alkoxy or amino groups; a $C_6$–$C_{20}$ aryloxy group; a $C7$–$C_{20}$ aralkyloxy group; or a $C_1$–$C_{20}$ acyloxy group.

18. The composition of claim 17 wherein said unidentate Ti(IV) compound is selected from the group consisting of isopropyl titanate, tetramethyl titanate, tetraethyl titanate, tetrabutyl titanate, tetra-(2-ethylhexyl)titanate, tetra-(isostearoyl)titanate and mixtures thereof.

19. The composition of claim 17 wherein said unidentate Ti(IV) compound is selected from the group consisting of titanium tetrachloride, titanium tetrabromide, titanium tetraiodide and mixtures thereof.

20. The composition of claim 10 wherein said chelated Sn(II) compound has the formula Sn(L$_s^1$R$^{16}$)

where
each R$^{16}$ is independently a $C_1$–$C_{20}$ alkylene, a $C_2$–$C_{20}$ alkenylene, a $C_6$–$C_{20}$ arylene or $C_7$–$C_{20}$ aralkylene, where any one of said alkylene, alkenylene, arylene or aralkylene groups may have one or more carbon atoms replaced with oxygen nitrogen or sulfur atoms and where any one of which groups may be substituted with one or more halogen, oxo or thio groups;

L$^1$ is oxygen, sulfur or NH; and s is 2.

21. The composition of claim 20 wherein said chelated Sn(II) compound is selected from the group consisting of tin(II)oxalate, tin(II)succinate, tin (II)maleate, Sn(SCH$_2$C; (=O)O) and mixtures thereof.

22. The composition of claim 10 wherein said unidentate Sn(II) compound has the formula Sn(R$^{13}$)$_2$ wherein
each R$^{13}$ is independently a $C_1$–$C_{20}$ alkoxy, a $C_6$–$C_{20}$ aryloxy, a $C_1$–$C_{20}$ acyloxy, a sulfonate, a $C_1$–$C_{20}$ alkyl sulfonate, or a $C_6$–$C_{20}$ aryl sulfonate.

23. The composition of claim 22 wherein said unidentate Sn(II) compound is selected from the group consisting of tin(II)acetate, tin(II) 2-ethylhexanoate, tin(II) methanesulfonate, tin(II)sulfonate, tin(II)octoate and mixtures thereof.

24. The composition of claim 10 further comprising an organic solvent.

25. The composition of claim 24 wherein said organic solvent is selected from the group consisting of methyl ethyl ketone, methyl butyl ketone, ethyl acetate, toluene, xylene, n-butoxy ethanol and mixtures thereof.

* * * * *